United States Patent
Leclercq et al.

(10) Patent No.: US 12,491,688 B2
(45) Date of Patent: Dec. 9, 2025

(54) METHOD FOR MANUFACTURING A COMPOSITE MATERIAL PART INTENDED TO BE ARTICULATED TO OTHER PARTS

(71) Applicants: SAFRAN LANDING SYSTEMS, Velizy-Villacoublay (FR); SAFRAN, Paris (FR)

(72) Inventors: Sylvain Didier Leclercq, Moissy-Cramayel (FR); Quentin Roirand, Moissy-Cramayel (FR); Dominique Marie Christian Coupe, Moissy-Cramayel (FR); Nicolas Tran, Moissy-Cramayel (FR)

(73) Assignees: SAFRAN LANDING SYSTEMS, Velizy-Villacoublay (FR); SAFRAN, Paris (FR)

( * ) Notice: Subject to any disclaimer, the term of this patent is extended or adjusted under 35 U.S.C. 154(b) by 0 days.

(21) Appl. No.: 18/877,990

(22) PCT Filed: Jun. 16, 2023

(86) PCT No.: PCT/FR2023/050879
§ 371 (c)(1),
(2) Date: Dec. 20, 2024

(87) PCT Pub. No.: WO2023/247869
PCT Pub. Date: Dec. 28, 2023

(65) Prior Publication Data
US 2025/0269614 A1   Aug. 28, 2025

(30) Foreign Application Priority Data
Jun. 22, 2022   (FR) .................................... 2206164

(51) Int. Cl.
*B29C 70/24* (2006.01)
*B29C 70/22* (2006.01)
(Continued)

(52) U.S. Cl.
CPC ........ *B29C 70/222* (2013.01); *B29K 2307/04* (2013.01); *B29L 2031/3076* (2013.01)

(58) Field of Classification Search
CPC .................................................. Y10T 74/2142
See application file for complete search history.

(56) References Cited

U.S. PATENT DOCUMENTS

| | | | |
|---|---|---|---|
| 7,704,429 B2 | 4/2010 | Dunleavy | |
| 7,926,761 B2 * | 4/2011 | Coupe | B29C 70/48 244/102 R |

(Continued)

FOREIGN PATENT DOCUMENTS

| | | |
|---|---|---|
| DE | 10 2004 054345 A1 | 5/2006 |
| DE | 102005059933 A1 * | 6/2007 |

(Continued)

OTHER PUBLICATIONS

International Search Report as issued in International Patent Application No. PCT/FR2023/050879, dated Oct. 12, 2023.

(Continued)

*Primary Examiner* — Jeffry H Aftergut
(74) *Attorney, Agent, or Firm* — Pillsbury Winthrop Shaw Pittman LLP (57) ABSTRACT

A method for manufacturing a fiber preform for a part, includes weaving a first core texture of elongate shape extending in a longitudinal direction and comprising, in cross section, a central portion having, on its opposite sides, two edges each including two non-interlinked fibrous portions, shaping the first texture which involves at least opening out the non-interlinked portions to form a positioning surface defined by the portions thus opened out and by an interleaved portion, situated between these opened-out portions, which can be formed by a prolongation of the central portion, and positioning a second belt texture over the opened-out lateral portions and the interleaved fibrous portion, the second texture forming a loop around the shaped first texture to define empty spaces for articulation to other parts.

14 Claims, 6 Drawing Sheets

(51) Int. Cl.
  *B29K 307/04*  (2006.01)
  *B29L 31/30*  (2006.01)

(56) References Cited

U.S. PATENT DOCUMENTS

| | | | |
|---|---|---|---|
| 9,022,733 B2 * | 5/2015 | Coupe | F01D 9/04 |
| | | | 29/889.22 |
| 2002/0056484 A1 * | 5/2002 | Uchida | D03D 11/02 |
| | | | 139/383 R |
| 2007/0007386 A1 | 1/2007 | Coupe et al. | |
| 2015/0239553 A1 * | 8/2015 | Leclercq | B29C 70/222 |
| | | | 244/102 R |

FOREIGN PATENT DOCUMENTS

| | | |
|---|---|---|
| DE | 10 2021 105040 B3 | 12/2021 |
| EP | 0 137 261 A2 | 4/1985 |
| FR | 3 102 391 A1 | 4/2021 |
| WO | WO-2009/138660 A2 * | 11/2009 |

OTHER PUBLICATIONS

International Preliminary Report on Patentability and the Written Opinion of the International Searching Authority as issued in International Patent Application No. PCT/FR2023/050879, dated Dec. 18, 2024.

\* cited by examiner

METHOD FOR MANUFACTURING A COMPOSITE MATERIAL PART INTENDED TO BE ARTICULATED TO OTHER PARTS

CROSS-REFERENCE TO RELATED APPLICATIONS

This application is the U.S. National Stage of PCT/FR2023/050879, filed Jun. 16, 2023, which in turn claims priority to French patent application number 2206164 filed Jun. 22, 2022. The content of these applications are incorporated herein by reference in their entireties.

TECHNICAL FIELD

The invention relates to a method for manufacturing a composite part preform intended to be articulated to other parts at its ends, and a method for manufacturing such a part.

PRIOR ART

The use of composite materials to replace metal materials can be proposed with a view to weight reduction, which is a constant concern in the particular case of aircraft parts. In this view, document U.S. Pat. No. 7,704,429 proposed the manufacture of landing gear struts made of composite material which comprise regions, called yokes, which are intended for articulation and the stress introduction with other parts and are formed by a laminated structure with intercalation of plies between primary plies extending the body of the reinforcement. This solution can nevertheless have disadvantages. Indeed, the yokes which have a laminated configuration can lead to an increase in the size of the stress introduction areas compared to the metal parts in order to avoid the risk of delamination. The weight saving of the overall system then becomes less interesting and the integration of the part more restrictive due to an increased bulk. Another problem is that the proposed manufacturing technique involves significant manual intervention that can lead to non-conformities and increased cost. Finally, the mechanical performance of the composite material proposed in this document can be improved, particularly in terms of compressive strength over a median area of the length of the part called the common area. One option to address this is to add material in the common area, which then penalizes the mass and therefore does not provide complete satisfaction.

The invention proposes to address all or a portion of the aforementioned disadvantages.

DISCLOSURE OF THE INVENTION

The invention relates to a method for manufacturing a fiber preform for a composite part intended to be articulated to other parts, comprising at least:
  forming by weaving a first fiber core texture of elongate shape extending in a longitudinal direction and comprising, in cross section, a central portion having, on its opposite sides, two positioning edges each comprising two non-interlinked lateral fibrous portions,
  shaping the first fiber texture which involves at least opening out the non-interlinked lateral portions to form a positioning surface defined by the lateral portions thus opened out and by an interleaved fibrous portion, situated between these opened-out portions, formed by a prolongation of the central portion or by this central portion, and
  positioning a second woven belt fiber texture over the opened-out lateral portions and the interleaved fibrous portion, the second texture forming a loop around the shaped first texture so as to define, at the longitudinal ends between the first and second textures, empty spaces intended for articulation to other parts.

The invention proposes a solution based on an assembly between a core and a belt each resulting from a weaving operation with a belt positioning surface formed by the interleaved portion and the opened-out non-interlinked portions located on either side thereof. Such a solution provides a good quality interface for the assembly, guaranteeing good holding of the composite material part, and in particular allows the improvement of mechanical performance compared to U.S. Pat. No. 7,704,429 in particular in terms of compressive strength, without penalizing the mass of the structure. In particular, it is advantageous to have a positioning surface of substantially flat shape due to the presence of the interleaved portion, by avoiding the use of a third-party filling material between the opened-out portions. The non-interlinked portions allow, after shaping, to increase the rigidity along all the stress axes of the part (optimization of the inertia). The belted technology according to the invention also allows to be more economical in terms of manufacturing cost than the discussed solution of the prior art.

According to one example, each positioning edge further comprises an interleaved fiber texture extending the central portion and located between the non-interlinked lateral fibrous portions, and the shaping further comprises cutting this interleaved fiber texture so as to form the interleaved fibrous portion.

According to this example, the interleaved portion is formed by a residual textile prolongation of the central portion within the positioning edges resulting from the cutting of the interleaved fiber texture.

According to one variant, the central portion comprises woven skins and a set of non-woven yarns located between the woven skins and held together by yarns coming therefrom, the woven skins extending beyond the central portion into the positioning edges to form the non-interlinked lateral fibrous portions, and wherein these non-interlinked portions are opened-out so as to fold them down to the height of the set of non-woven yarns during shaping.

According to this variant, the interleaved portion is formed by the central portion itself, located at the same level as the opened-out non-interlinked portions, and allows to avoid having to carry out the cutting operation described above.

Furthermore, the set of non-woven yarns forms a stiffening portion which allows to further improve the compressive strength compared to a structure obtained entirely by three-dimensional weaving.

In an exemplary embodiment, the non-interlinked lateral fibrous portions are formed by weaving first and second yarns and have a first volume ratio of first yarns relative to the second yarns, and the second texture is formed by weaving first and second yarns and has a second volume ratio of first yarns relative to the second yarns, the relative difference between the first and second volume ratios not exceeding 25%, for example not exceeding 10%.

Such a feature helps to further improve the mechanical strength of the composite material part to be obtained.

In an exemplary embodiment, the first and second textures are made of carbon yarns.

The invention also relates to a method for manufacturing a composite material part intended to be articulated to other parts, comprising at least:

forming a fiber preform for the part to be obtained by implementing a method as described above, and forming a matrix in a porosity of the fiber preform thus obtained.

In one exemplary embodiment, the matrix is organic.

In one exemplary embodiment, the part is a landing gear strut, a segment of a landing gear strut, or a brake bar.

DESCRIPTION OF THE EMBODIMENTS

Figure 1:
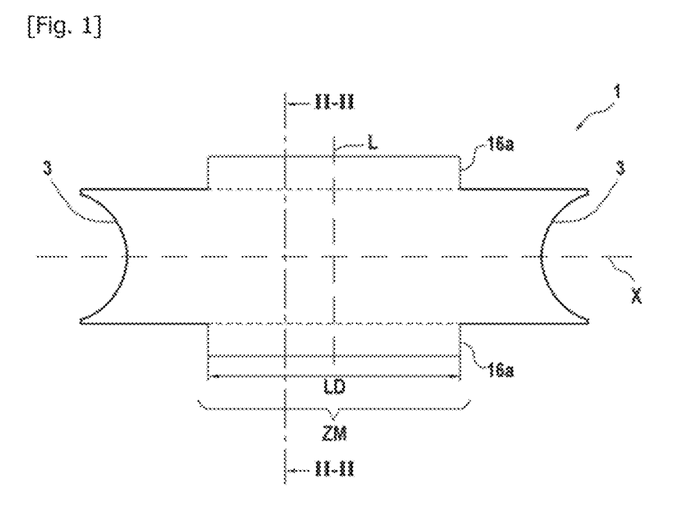
FIG. 1 schematically shows an example of a first fiber core texture that can be used in the context of the invention.

FIG. 1 illustrates an example of a first fiber texture 1 that can be used in the context of the invention. The first texture 1 has an elongate shape extending along a longitudinal direction X. It can be obtained by three-dimensional weaving in one piece by providing non-interlinking areas, as will be described below. "Three-dimensional weaving" or "3D weaving" means a weaving method by which at least some of the first yarns directed in the direction X bind second transverse yarns to the first yarns on several layers of second yarns. Such weaving can be carried out in a Jacquard type loom, in a manner known per se. The first texture 1 is intended to form the core of the fiber reinforcement of the part to be obtained. For example, an "interlock" weaving pattern can be used to form the first texture 1. The first texture 1 has longitudinal ends 3 that have a curved shape, for example substantially circular, and that are intended to define, in the part to be obtained, empty spaces dedicated to articulation to other parts. In the example illustrated, the longitudinal ends 3 are substantially the same size, but the person skilled in the art will recognize that other variants are possible and in particular that the invention can be applied to a part having longitudinal ends of different size.

Figure 2:
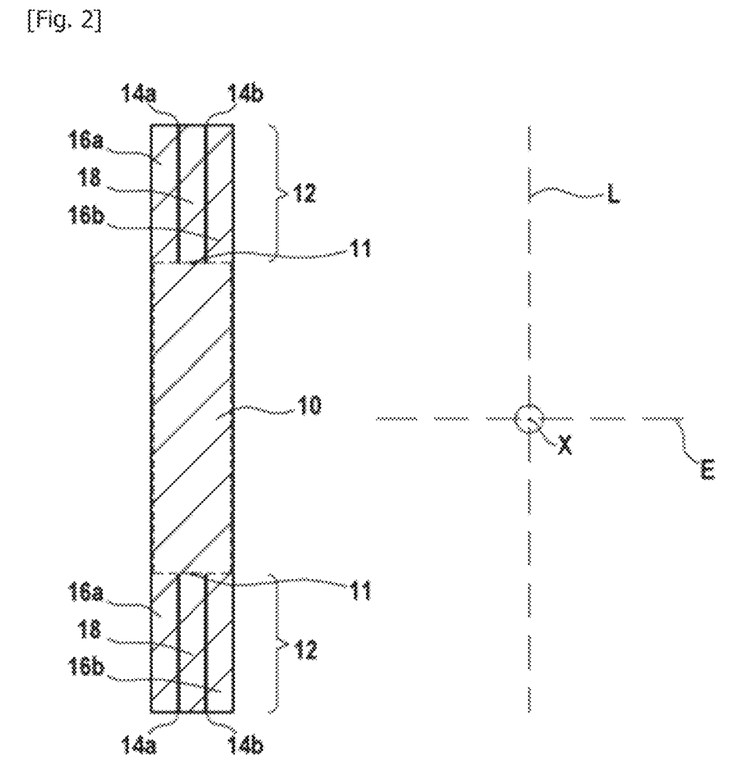
FIG. 2 schematically shows a cross-section of the first texture according to FIG. 1.

The first texture 1 may be in the form of a strip and FIG. 2 shows a cross-section thereof taken transversely to the longitudinal direction X. The first texture 1 comprises a central portion 10 which has on its opposite sides 11 two edges 12 which are intended for the positioning of a second texture, called positioning edges 12. The central portion 10 as well as the edges 12 each extend along the longitudinal direction X. The central portion 10 is located between the edges 12. In the example illustrated, the edges 12 as well as the central portion 10 are offset along the width of the first texture (direction L). Each positioning edge 12 successively has, in the example illustrated along the thickness of the first texture 1 (direction E) which corresponds to its smallest dimension, a first non-interlinked lateral fibrous portion 16a, an interleaved fiber texture 18 and a second non-interlinked lateral fibrous portion 16b. A first non-interlinking area 14a is present between the first portion 16a and the texture 18 and a second non-interlinking area 14b is present between the texture 18 and the second portion 16b. In the non-interlinking areas 14a, 14b, it has been intentionally omitted to weave between them layers of yarns of the texture 18 and of the portion 16a, 16b so as to be able to open out the latter as will be described below. The non-interlinking areas 14a, 14b are initiated from the sides 11. Each of the portions 16a, 16b extends the central portion 10 beyond the sides 11. In the example illustrated, the portions 16a, 16b as well as the interleaved texture 18 are obtained by three-dimensional weaving like the central portion 10 but it does not depart from the scope of the invention when it is otherwise, in particular the interleaved texture can be formed of layers of non-woven yarns (unidirectional layers of yarns). It will be noted that the non-interlinking areas 14a, 14b can extend over all or part of the length of the first texture 1, in particular over a length LD at least 50% of the latter. The non-interlinking areas 14a, 14b may in particular be present on the median area ZM of the length of the first texture 1. The example considered concerns the case where the height of the non-interlinking areas 14a, 14b measured along the direction L does not change along the longitudinal direction X, but it does not depart from the scope of the invention when this is the case, in particular in the particular case where the longitudinal ends 3 have different dimensions. In particular, the height of the non-interlinking areas 14a, 14b may vary so as to reach a maximum in the median area ZM, thus further promoting the quality of the interface with the belt and therefore the mechanical properties of the common area, in particular the inertia of the core, thus increasing the resistance to buckling under compression loading or vibration modes. A possible structure of first texture 1 was just described, the following focuses on detailing, in connection with FIGS. 3A to 3D, a possible shaping thereof in order to prepare the positioning of the second belt texture.

Figure 3A:
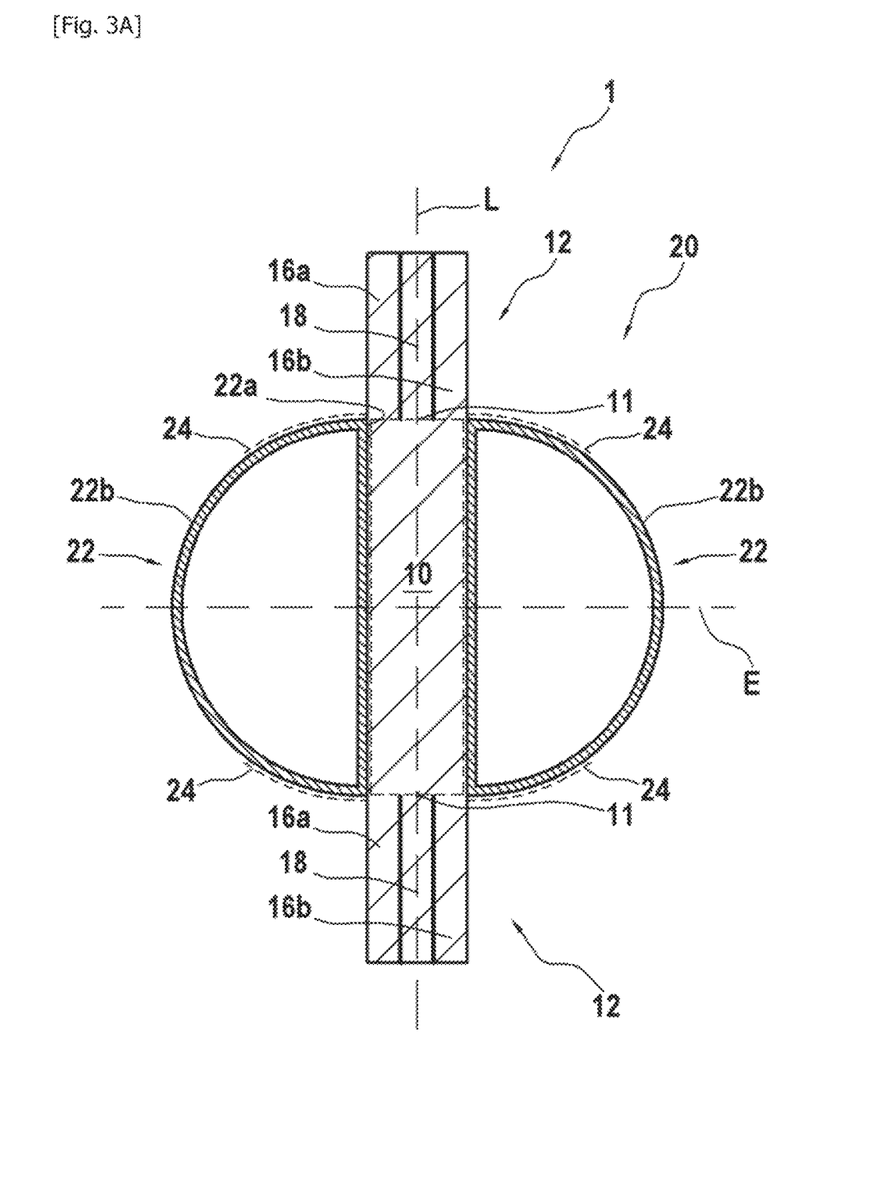
FIG. 3A shows a first step of an example of shaping the first texture according to the invention.
Figure 3B:
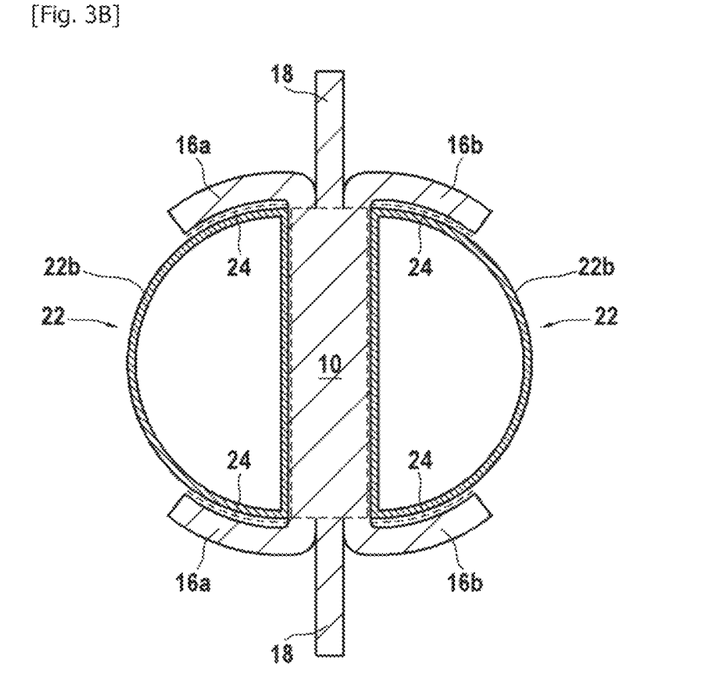
FIG. 3B shows a second step of the example of shaping the first texture according to the invention.
Figure 3C:
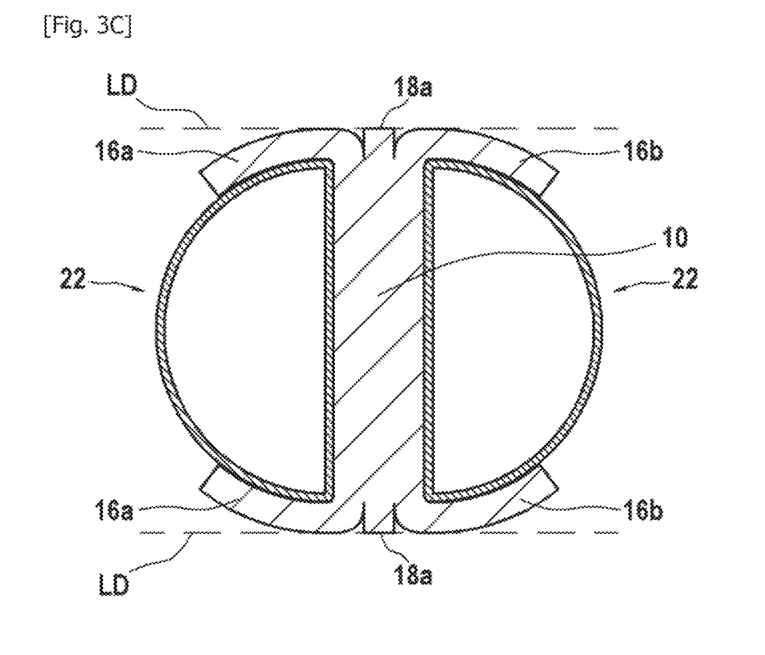
FIG. 3C shows a third step of the example of shaping the first texture according to the invention.

The first texture 1 is positioned in a first tool 20 which comprises two segments 22 intended to bear on the first texture 1, as illustrated in FIG. 3A. More precisely, the central portion 10 is held between the segments 22 which can optionally apply a compacting pressure thereto if it is desired to adjust the fiber rate. The two segments 22 can be offset along the direction E as illustrated. The segments 22 have a face 22a, which may be substantially flat, bearing on the central portion 10 and a curved face 22b extending from the face 22a in the opposite direction of the first texture 1. The face 22b defines in particular in the vicinity of the positioning edges 12 an area 24 on which the non-interlinked portions 16a, 16b are intended to be draped during the cutting of the interleaved texture 18. Thus, as illustrated in FIG. 3B, the non-interlinked portions 16a, 16b are spaced apart from each other so as to position them on the area 24 of a respective segment 22 and thus release them from the interleaved texture 18. The non-interlinked portions 16a, 16b folded over the area 24 are held in this area 24 by means known per se, for example by pinching. The interleaved texture 18 is then cut along a cutting line LD as shown in FIG. 3C. This cutting can be carried out by water jet cutting, but the person skilled in the art will recognize that other techniques are possible. As illustrated, the cutting of the interleaved texture 18 can be carried out flush with the non-interlinked portions 16a, 16b held on the segments 22. Furthermore, the curved shape of the face 22b ensures that the non-interlinked portions 16a, 16b extend away from the cutting line LD, thus avoiding any risk of damage during this operation. The cutting residue of the texture 18 forms the interleaved portion 18a which is located between the non-interlinked portions 16a, 16b and will serve as a bearing surface for the belt texture. The portion 18a is located in the textile prolongation of the central portion 10. The textile portion 18a may have a sufficiently short length to have sufficient rigidity allowing it to keep a straight shape along the direction L in the absence of any holding tool.

Figure 3D:
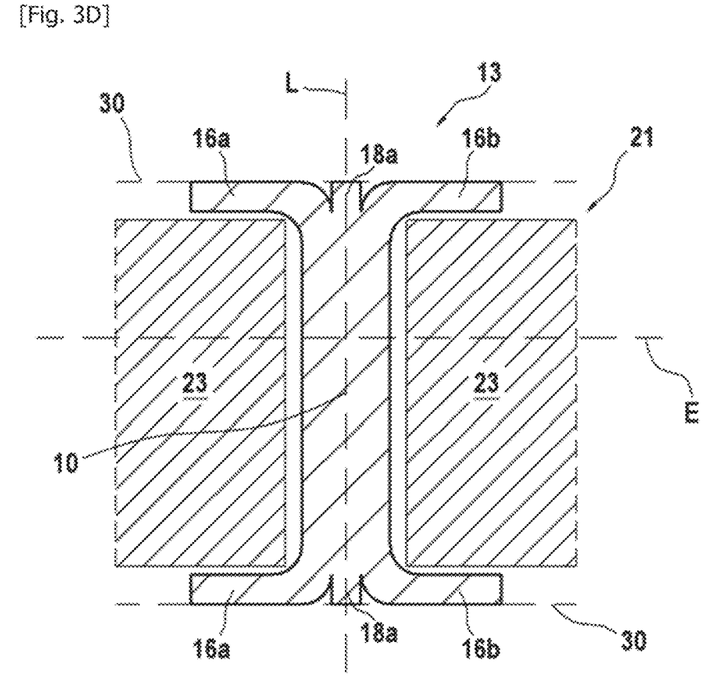
FIG. 3D shows a fourth step of the example of shaping the first texture according to the invention.
Figure 4:
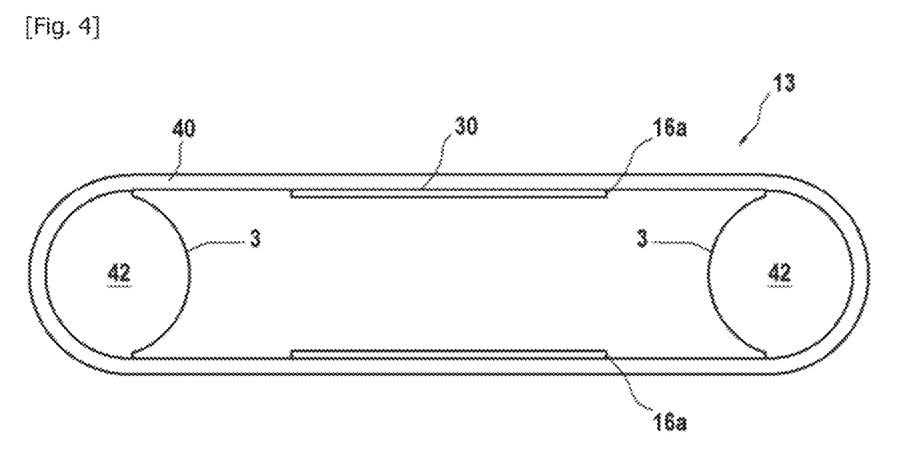
FIG. 4 schematically shows an example of a composite material part preform obtained after positioning the second belt texture on the shaped first texture.

Once this cutting has been carried out, the first texture is extracted from the tool 20 and is positioned between two shapes 23 of a second separate tool 21 which is a tool for shaping into the shape of the core of the part to be obtained. The shapes 23 can be offset along the direction E as illustrated. FIG. 3D illustrates this shaping where the non-interlinked portions 16a and 16b are opened out on the shapes 23 so as to form lateral fins and in which the first texture 13 thus shaped has an I-shape in cross section (called a double angle shape). In the illustrated example, each opened-out non-interlinked portion 16a, 16b forms an elbow with the central portion 10, with an angle substantially equal to 90° with the direction L. The shaped first texture 13 defines on either side of the central portion 10, at the positioning edges 12, a positioning surface 30 on which the second belt texture is intended to be deposited. The positioning surface 30 is defined by the opened-out non-interlinked portions 16a, 16b as well as by the interleaved portion 18a extending the central portion 10 which allows to fill the lack of material which would result from opening the non-interlinked portions 16a, 16b out. This gives a good interface with the belt and in particular a positioning surface 30 of substantially flat shape, as illustrated in FIG. 3D. The example that has just been described uses two different tools, one for cutting, the other for shaping the first texture, but it is does not depart from the scope of the invention if the same tool is used for these two operations. The method continues by positioning a second woven belt fiber texture 40 around the first texture 13 thus shaped by the tool 21, as illustrated in FIG. 4. The second texture 40 can have the shape of a strip that is wound around the shaped first texture 13. When it is positioned, the second texture 40 bears on the opened-out portions 16a, 16b but also on the interleaved portion 18a, which allows to provide a good interface between the two textures. The second texture 40 can be in the form of a single strip of fabric, but it does not depart from the scope of the invention if it is in the form of several strips placed end to end or side by side. The second texture 40 can also be obtained by three-dimensional weaving, for example with an "interlock" pattern. The second texture 40 defines a closed loop around the first texture 13 which is shaped and defines empty spaces 42 intended for articulation to the other parts. Inserts (not shown) can be temporarily used at the longitudinal ends 3 and the second texture 40 can be wrapped around them so as to guarantee the desired shape for the end regions. As indicated above, the volume ratios between the warp and weft yarns of each of the first 11 and second 40 textures can be similar. These volume ratios correspond to the ratio: [volume occupied by the warp yarns]/[volume occupied by the weft yarns] for each considered texture.

A counter-mold is then positioned around the assembly of the two textures 13 and 40 so as to define with the tool 21 a cavity for introducing the matrix material and the assembly is then densified, for example by introducing a resin, such as an epoxy resin, followed by crosslinking thereof if it is a thermosetting resin or by cooling if it is a thermoplastic resin. The formation of the matrix can be carried out by resin transfer molding technique which corresponds to a technique known per se. A composite material part is thus obtained, said part is intended to be articulated to other parts at its longitudinal ends. The fiber reinforcement of the part can be formed of carbon yarns and the part can have an organic matrix as just described. The part may or may not be intended for an aeronautical application. The part can for example be a connecting rod, a landing gear strut or a constituent element thereof, or a brake bar. The part may be intended to undergo mainly tensile and compressive forces in operation. The part obtained can be mounted to other parts by positioning through the empty spaces 42 a hinge pin for connection to other parts as well as a contact insert with this pin.

The example that has just been described concerns the case of an interleaved portion 18a formed by a textile prolongation of the central portion 10. However, the invention also targets the case where the central portion itself is located between the opened-out non-interlinked portions so as to offer a bearing surface to the second belt texture. Such an example will now be discussed in connection with FIGS. 5 and 6A to 6C.

Figure 5:
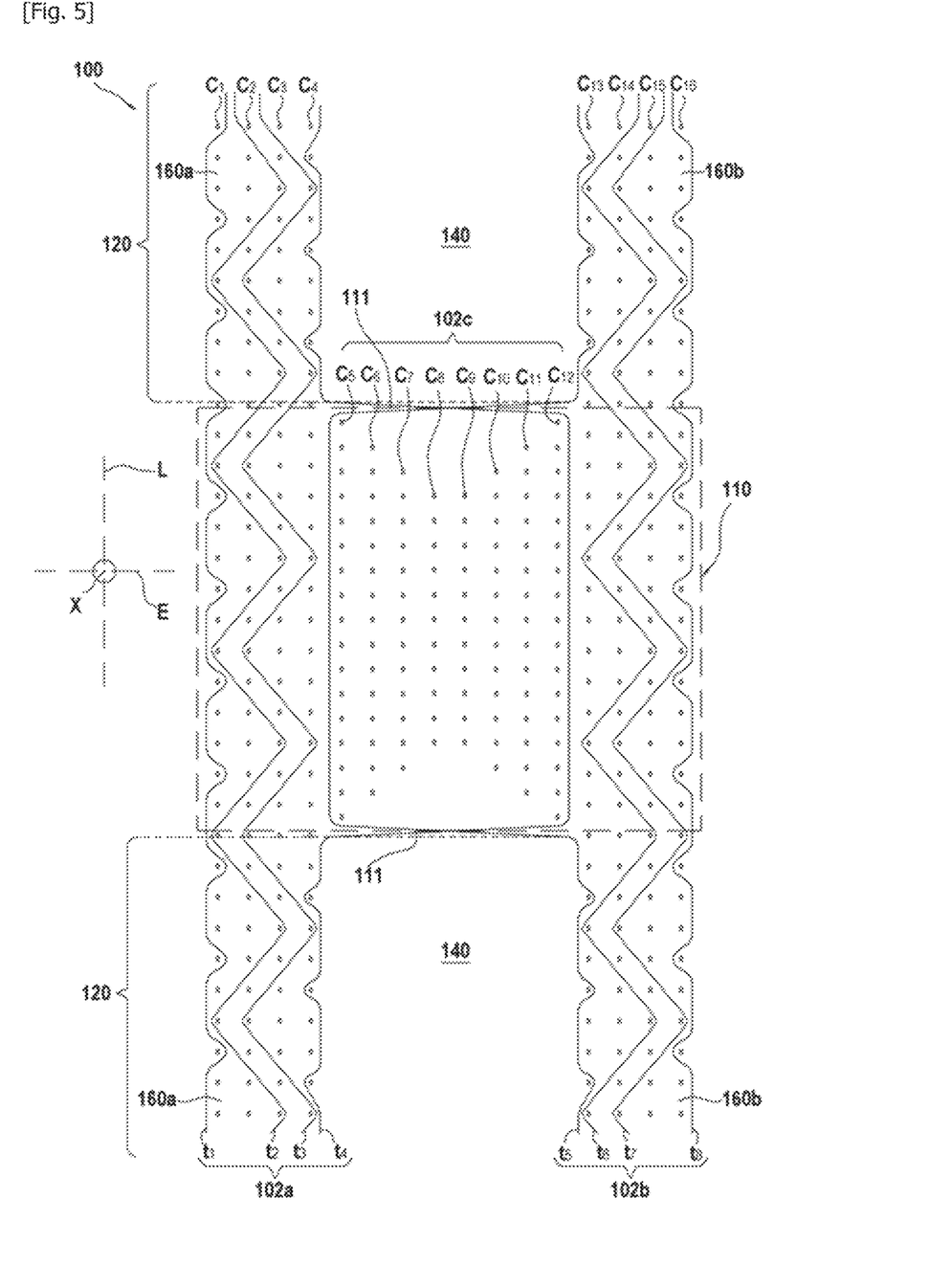
FIG. 5 schematically shows a cross section of a variant of the first texture that can be used in the context of the invention.
Figure 6A:
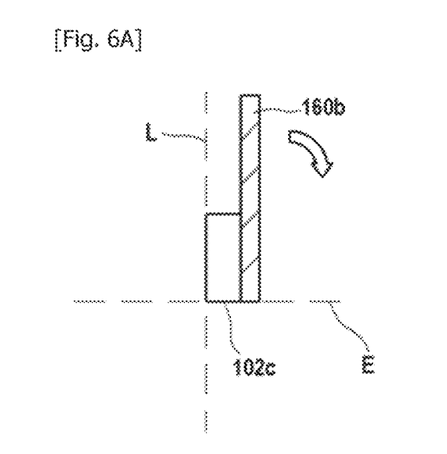
FIG. 6A shows a first step of a possible shaping of the texture of FIG. 5.
Figure 6B:
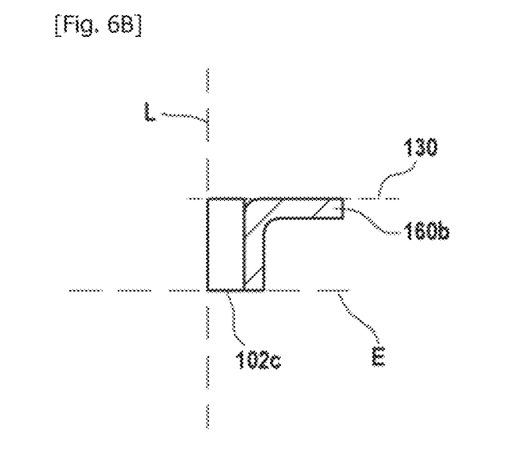
FIG. 6B shows a second step of this shaping.
Figure 6C:
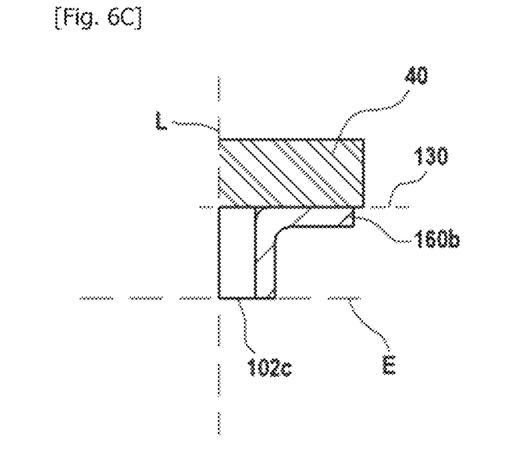
FIG. 6C shows a third step of this shaping with the positioning of the belt on this shaped texture.

FIG. 5 is a cross-sectional view of a variant of first texture 100 which comprises, over all or part of its length, a central portion 110 having, on its opposite sides 111, two positioning edges 120 which each comprise non-interlinked lateral portions 160a, 160b separated by an non-interlinking area 140 allowing a spacing of these portions 160a, 160b relative to each other. As in the previous example, the positioning edges 120 and the central portion 110 are offset along the width direction L, and the non-interlinked portions 160a, 160b are offset along the thickness direction E. The first texture 100 comprises woven skins 102a, 102b, for example obtained by three-dimensional weaving, which form a segment of the central portion 110 and extend in the prolongation of this portion so as to form the non-interlinked portions 160a, 160b. The skins 102a, 102b are formed by a weave between first yarns C1-C4 and C13-C16 extending along the longitudinal direction X with second yarns t1-t8 extending along the direction L. In general, it will be recognized that the number of layers of yarns as well as the weaving pattern illustrated are provided only by way of example and can be modified without departing from the scope of the invention. The central portion 110 also comprises a set 102c of non-woven yarns C5-C12 located between the skins 102a, 102b and held together by yarns coming therefrom. Indeed, it is noted that the yarn t4 extends in the first skin 102a outside the central portion 110 and is deflected in order to emerge from this first skin 102a to bind the set 102c of yarns C5-C12 in the central portion 110. Similarly, the yarn t5 extends in the second skin 102b outside the central portion 110 and is deflected in order to emerge from this second skin 102b to bind the set 102c of yarns C5-C12 in the central portion 110 on the side opposite the yarn t4. An encapsulation of the set 102c of non-woven yarns C5-C12 is obtained between the skins 102a, 102b, these yarns C5-C12 being held in place by the deflected yarns t4-t5. In the example illustrated, there are in the central portion 110 successively along the thickness direction E: the first skin 102a, the set 102c of non-woven yarns and the second skin 102b. It will be noted that the set 102c of non-woven yarns is only present in the central portion 110 and not in the positioning edges 120. It may also be noted that the yarns C5-C12 may be non-woven over only a segment of the length of the first texture 100, for example over its median area ZM, but may be woven over the longitudinal ends of the first texture 100. The length where the yarns C5-C12 are non-woven may be greater than or equal to 50% of the length of the first texture 100. FIGS. 6A to 6C illustrate, in a simplified manner, the shaping of the first texture of FIG. 5 as well as the positioning of the second belt texture 40, it being understood that the configuration is symmetrical with respect to the directions L and E. In the considered example, there is an opening of the non-interlinked portions 160a, 160b on a shape (not illustrated) so as to form an angle substantially of 90° with the direction L and to position the non-interlinked portions 160a, 160b at the height of the set 102c of non-woven yarns. This height is taken along the direction L. This gives a positioning surface 130 of substantially flat shape with, at the same level, the non-interlinked portions 160a, 160b as well as the set of yarns 102c of the central portion 110 which is situated between these non-interlinked portions and thus defines a bearing surface for the belt texture 40.

The invention claimed is:

1. A method for manufacturing a fiber preform for a composite part intended to be articulated to other parts, comprising:
    forming by weaving a first fiber core texture of elongate shape extending in a longitudinal direction and comprising, in cross section, a central portion having, on its opposite sides, two positioning edges each comprising two non-interlinked lateral fibrous portions,
    shaping the first fiber texture which involves at least opening out the non-interlinked lateral portions to form a positioning surface defined by the lateral portions thus opened out and by an interleaved fibrous portion, situated between the opened-out portions, formed by a prolongation of the central portion or by this central portion, and
    positioning a second woven belt fiber texture over the opened-out lateral portions and the interleaved fibrous portion, the second texture bearing on the interleaved portion obtained after opening out the non-interlinked portions, the second texture forming a loop around the shaped first texture so as to define, at the longitudinal ends between the first and second textures, empty spaces intended for articulation to other parts.

2. The method according to claim 1, wherein each positioning edge further comprises an interleaved fiber texture extending the central portion and located between the non-interlinked lateral fibrous portions, and wherein the shaping further comprises cutting this interleaved fiber texture so as to form the interleaved fibrous portion.

3. The method according to claim 1, wherein the central portion comprises woven skins and a set of non-woven yarns located between the woven skins and held together by yarns coming therefrom, the woven skins extending beyond the central portion into the positioning edges to form the non-interlinked lateral fibrous portions, and wherein the non-interlinked portions are opened-out so as to fold them down to the height of the set of non-woven yarns during shaping.

4. The method according to claim 1, wherein the non-interlinked lateral fibrous portions are formed by weaving first and second yarns and have a first volume ratio of first yarns relative to the second yarns, and wherein the second texture is formed by weaving first and second yarns and has a second volume ratio of first yarns relative to the second yarns, the relative difference between the first and second volume ratios not exceeding 25%.

5. The method according to claim 1, wherein the first and second textures are made of carbon yarns.

6. A method for manufacturing a composite material part intended to be articulated to other parts, comprising:
    forming a fiber preform for the part to be obtained by implementing a method according to claim 1, and
    forming a matrix in a porosity of the fiber preform thus obtained.

7. The method according to claim 6, wherein the matrix is organic.

8. The method according to claim 6, wherein the part is a landing gear strut, a segment of a landing gear strut or a brake bar.

9. The method according to claim 1, wherein shaping the first fiber texture comprises spacing apart the non-interlinked portions from each other by folding, and wherein the thus folded non-interlinked portions are flush with the interleaved portion to form a face on which the second texture bears.

10. The method according to claim 1, wherein the interleaved portion is positioned within a gap formed by opening the non-interlinked portions out.

11. The method according to claim 2, wherein a cutting residue of the interleaved fiber texture forms the interleaved portion on which the second texture bears.

12. The method according to claim 11, wherein the cutting residue is flush with the non-interlinked portions.

13. The method according to claim 11, wherein the cutting residue has a sufficiently short length to have sufficient rigidity to keep a straight shape, without support of a holding tool.

14. The method according to claim 1, wherein the second texture bears on both the opened-out lateral portions and the interleaved fibrous portion.

* * * * *